(12) United States Patent
Colborn et al.

(10) Patent No.: US 6,787,259 B2
(45) Date of Patent: Sep. 7, 2004

(54) SECONDARY POWER SOURCE FOR USE IN A BACK-UP POWER SYSTEM

(75) Inventors: Jeffrey A. Colborn, Cardiff by the Sea, CA (US); Erol Erturk, Cardiff by the Sea, CA (US); Rajagopalan Sundar, San Diego, CA (US); Raymond H. Alstadt, Collierville, TN (US)

(73) Assignee: Metallic Power, Inc., Carlsbad, CA (US)

(*) Notice: Subject to any disclaimer, the term of this patent is extended or adjusted under 35 U.S.C. 154(b) by 0 days.

(21) Appl. No.: 10/342,579

(22) Filed: Jan. 15, 2003

(65) Prior Publication Data

US 2004/0053093 A1 Mar. 18, 2004

Related U.S. Application Data (60) Provisional application No. 60/421,985, filed on Oct. 28, 2002, and provisional application No. 60/410,559, filed on Sep. 12, 2002.

(51) Int. Cl.[7] .............................................. H01M 8/04
(52) U.S. Cl. ............................................. 429/23; 429/22
(58) Field of Search ....................................... 429/22, 23

(56) References Cited

U.S. PATENT DOCUMENTS

| | | | |
|---|---|---|---|
| 4,465,910 A | 8/1984 | Martin | 200/148 R |
| 4,760,322 A | 7/1988 | Crampton | 320/14 |
| 5,160,851 A | 11/1992 | McAndrews | 307/66 |
| 5,225,712 A * | 7/1993 | Erdman | 290/44 |
| 5,777,454 A | 7/1998 | McAndrews et al. | 320/51 |
| 5,952,117 A | 9/1999 | Colborn et al. | 429/27 |
| 5,969,435 A | 10/1999 | Wilhelm | 307/64 |
| 6,064,125 A | 5/2000 | Stendardo et al. | 307/64 |
| 6,104,162 A * | 8/2000 | Sainsbury et al. | 320/111 |
| 6,153,328 A | 11/2000 | Colborn | 429/51 |
| 6,162,555 A | 12/2000 | Gutierrez et al. | 429/15 |
| 6,188,139 B1 * | 2/2001 | Thaxton et al. | 290/4 R |
| 6,201,319 B1 | 3/2001 | Simonelli et al. | 307/26 |
| 6,288,456 B1 | 9/2001 | Cratty | 307/64 |
| 6,296,958 B1 | 10/2001 | Pinto et al. | 429/15 |
| 6,304,006 B1 * | 10/2001 | Jungreis | 307/64 |
| 6,348,782 B1 | 2/2002 | Oughton, Jr. et al. | 323/284 |
| 6,362,540 B1 | 3/2002 | Hill | 307/52 |
| 6,404,658 B1 | 6/2002 | Reilly | 363/125 |
| 6,452,289 B1 | 9/2002 | Lansberry et al. | 307/25 |

FOREIGN PATENT DOCUMENTS

WO     WO03/032429 A2     4/2003

* cited by examiner

*Primary Examiner*—Bruce F. Bell
(74) *Attorney, Agent, or Firm*—Patterson, Thuente, Skaar & Christensen, P.A.

(57) ABSTRACT

A regulated DC power supply facilitates extended and uninterrupted power to a load by using a secondary power source such as a regenerative fuel cell that has its DC power output conditioned by a power converter. The DC power supply includes a rectifier that converts AC power from an AC power source to DC power for a load coupled to a DC bus. A fuel cell arrangement is electrically coupled to a power converter that is coupled in turn to the DC bus, the converter conditions an unconditioned DC power output of the fuel cell to the load. A system controller is communicatively coupled to the rectifier, the converter and to a fuel cell controller, the fuel cell controller initiating DC power output from the fuel cell arrangement upon detecting the AC power outage (or disengaging the fuel cell upon resumption of AC power).

26 Claims, 5 Drawing Sheets

SECONDARY POWER SOURCE FOR USE IN A BACK-UP POWER SYSTEM

RELATED APPLICATIONS

The current application claims the benefit of priority from the provisional application filed on Oct. 28, 2002, entitled "System for Providing Backup Power From a Regenerative Fuel Cell" having Ser. No. 60/421,985, and from the provisional application filed on Sep. 12, 2002, entitled "A Method of Providing Long Back-up By Combining Battery and Fuel Cell on Same DC Bus" having Ser. No. 60/410,559, both of which are herein incorporated by reference.

FIELD OF THE INVENTION

The present invention generally relates to secondary power sources such as fuel cells and more particularly to back-up power systems that utilize batteries or fuel cells to provide uninterrupted power to a critical load upon failure or interruption of the primary power source.

BACKGROUND OF THE INVENTION

Power plants for supplying direct current (DC) electrical power are common throughout the world, and are often used to power critical computing, communications, and control equipment, as well as for many other uses. A typical DC power plant includes one or more rectifiers for converting alternating current (AC) from the electrical grid into DC power, which is fed to an electrical bus. The equipment using the power, the load, is connected to this bus and draws power from it. Typically, batteries are also connected to the bus in order to provide backup power should the primary AC power source or the rectifiers fail. Various types of batteries can be used for this purpose, such as lead-acid, nickel-cadmium, lithium-ion, and others.

Additionally, it is possible to directly supply power to the DC bus from another secondary power source, or use as a back-up power source on the DC bus, a fuel cell, a solar panel, a windmill, a DC generator using an internal combustion engine, or other power sources. An advantage of such secondary power sources over batteries is that they often are capable of providing far longer backup times. However, unlike the batteries, these secondary power sources sometimes cannot provide power on short enough notice (or instantaneously) to provide uninterrupted power to the load upon a failure of the primary AC power. Back-up power plant systems that have the ability to control and take advantage of different power sources may be attractive. Back-up power systems may also be set-up to handle short primary outages differently than ultra-long power outages. Such control systems could reduce power requirements of the load in a given outage, thereby reducing the power requirements of the secondary power sources, and potentially lowering the cost and size of such power sources. A system or method of operating a DC power plant designed to take advantage of these possibilities would be economically attractive.

A secondary power source may be used to supply power to the DC bus with or without batteries. In either case, secondary power sources such as fuel cells, windmills, propane generators, and others typically require electronic conditioning of their output power before it can be fed to the DC bus. A system or method designed to provide conditioned power that is compatible with the present conventions and DC power plant design would be useful.

Fuel cell technologies have been rapidly improving and are becoming attractive secondary power source candidates for integration into applications. There are a variety of fuel cell technologies that can be considered as secondary power sources. Depending on design and technology, cells could use hydrogen, zinc, aluminum, methanol, and other types of hydrocarbons as fuel. A regenerative fuel cell is a fuel cell in which the fuel can be electrically recovered from the reaction products of the fuel cell discharge reaction. The fuel can then be re-used. In the case of a hydrogen regenerative fuel cell, the reaction product of the fuel cell discharge is water ($H_2O$), which can be electrolyzed, or regenerated, back into fresh hydrogen fuel using electricity. In the case of a zinc regenerative fuel cell, the reaction product of the fuel cell discharge is zinc oxide (ZnO) or other zinc-containing reaction products, which can electrolyzed, or regenerated, back into fresh zinc fuel using electricity. For a regenerative fuel cell, the regeneration apparatus can be separated from the fuel cell or packaged together with the fuel cell. Integrated regenerative fuel cells are a desirable configuration for back-up power applications since existing back-up systems deploy rechargeable batteries.

Metal-air fuel cells are described further in U.S. Pat. No. 6,296,958 to Pinto et al., entitled "Refuelable Electrochemical Power Source Capable Of Being Maintained In A Substantially Constant Fuel Condition And Method Of Using The Same," and U.S. Pat. No. 5,952,117, entitled "Method And Apparatus For Refueling An Electrochemical Power Source," both of which are incorporated herein by reference. For additional information on this embodiment of a zinc/air battery or fuel cell, the reader is referred to U.S. Pat. Nos. 6,153,328; and 6,162,555, which are hereby incorporated by reference herein as though set forth in full.

Although fuel cells can provide continuous power to a load for longer periods of time, as opposed to a conventional battery back-up source, there are issues with fuel cells that make them more difficult to integrate into traditional back-up systems when compared to lead-acid batteries. For example, fuel cells need controller and control systems to perform operations such as the movement of fuel, whereas batteries can be deployed without controllers. Furthermore, it is generally difficult for fuel cells to provide instant startup at full or rated power when compared to a conventional lead-acid battery. Even if a fuel cell could provide instant start-up, it would have to have an output impedance similar to a battery in order to be able to handle sudden high-power requirements such as clearing fuses and circuit breaker faults. Although fuel cell technology may advance to address these issues, today they need to be addressed in order to integrate fuel cells as power sources in back-up applications. Therefore, there is a need for a system and an apparatus that can integrate a power source such as a fuel cell into conventional back-up systems, in order to make use of its advantages such as the capability of providing long-term back-up power.

SUMMARY OF THE INVENTION

According to one aspect of the invention, a regulated DC power supply includes a rectifier coupled between a primary AC power source and a DC bus, the rectifier adapted to convert AC power from the AC power source to DC power for a load that draws power from the DC bus. The power supply also includes a fuel cell arrangement electrically coupled to a power converter that is coupled to the DC bus, wherein the converter is adapted to condition an unconditioned DC power output of the fuel cell. The conditioned DC output of the converter is coupled to the DC bus that powers the load. In addition, a fuel cell controller is communicatively coupled with the fuel cell arrangement and the rectifiers arrangement and is adapted to initiate DC power output from the fuel cell arrangement upon detecting an AC power outage. The fuel cell controller is further adapted to disengage the fuel cell arrangement upon detecting AC power resumption. In another embodiment of the invention, the rectifier arrangement may also incorporate a system controller central to the rectifiers, and the fuel-cell controller may also communicate with this system controller.

In a related embodiment, the fuel cell in the DC power supply is regenerative and can be of the type that is metal/air or hydrogen. A regenerative fuel cell (RFC) comprises a fuel storage component, a reaction-product storage component, a fuel cell stack that produces electrical power from the electrochemical reaction of the fuel (typically zinc or hydrogen), an oxidant (typically oxygen from the air), and a regenerator or electrolyzer that uses electrical power from a primary source (such as the electrical grid) to convert the reaction product (such as water, zincate, or zinc oxide) back into fuel (such as hydrogen or zinc) and the oxidant (such as oxygen).

In another embodiment, the DC power supply includes a plurality of rectifiers and power converters and optimally includes a battery arrangement electrically coupled to the DC bus to provide uninterrupted DC power to the load upon an AC power source outage. The battery arrangement enables the voltage on the DC bus to be sustained throughout the initial phase of the AC power outage during which the fuel cell system is preparing itself to supply full power to the DC bus. This system would solve the instant start-up problem generally associated with fuel cells provided that the start-up time of the fuel cell is relatively short, i.e., a few minutes or seconds or less as opposed to several hours.

In some applications it is desirable to avoid activating the fuel cell for short outages (for example, a 5-second outage), and instead the backup power needs can be handled by sizing battery arrangement such that it handles the initial start-up and appropriate amount of short outages. Further, the battery arrangement integration solves the potential mismatch in impedance as the battery provides additional current to clear fuses and breaker faults in the distribution network on the DC bus or in the load. The battery arrangement can also supply sufficient current to power the full load for a pre-determined period while the load is partially curtailed before switching over to fuel cell power. This is particularly important where the fuel cell is only designed to power part of the load during an AC power outage to reduce the power requirements (and hence the cost and size) of the fuel cell. Such a system could make it more economically feasible to keep a part of a load, such as the more critical communication and control functions that the DC plant may be powering, available for longer back-up times, while utilizing the battery arrangement on the full plant load for the shorter back-up times.

According to another aspect of the invention, a method of providing extended backup power to a load via a power plant having a battery backup arrangement includes providing DC power to the load from the battery arrangement via a DC bus upon detecting an interruption in a primary power source. A portion of the load is shed or reduced when the battery voltage reaches a predetermined transition voltage and then power is provided on the DC bus at a predetermined voltage from a fuel cell arrangement. A fuel cell controller is used to share current between the battery arrangement and the fuel cell arrangement, wherein the fuel cell controller reduces the current load on the battery. Upon detecting primary power source resumption, the fuel cell controller switches the load from the fuel cell and battery arrangement to the primary power source.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is generally directed to a method and a system for providing extended DC power to a load using a DC power supply that incorporates a secondary power source, such as a regenerative fuel cell, coupled to a DC bus that supplies power to a load. While the present invention is not necessarily limited to such an application, the invention will be better appreciated using a discussion of example embodiments in such a specific context.

Figure 1:
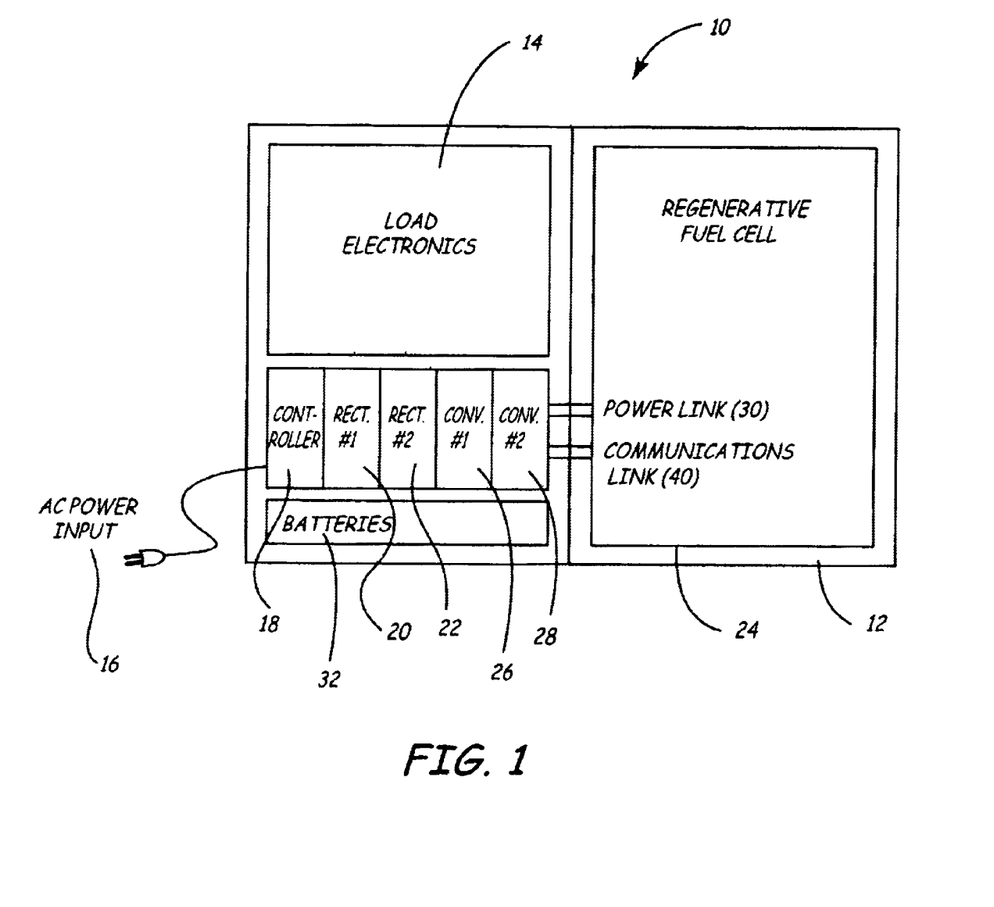
FIG. 1 is a block diagram of a regulated DC power supply incorporating a fuel cell according to the present invention.
Figure 2:
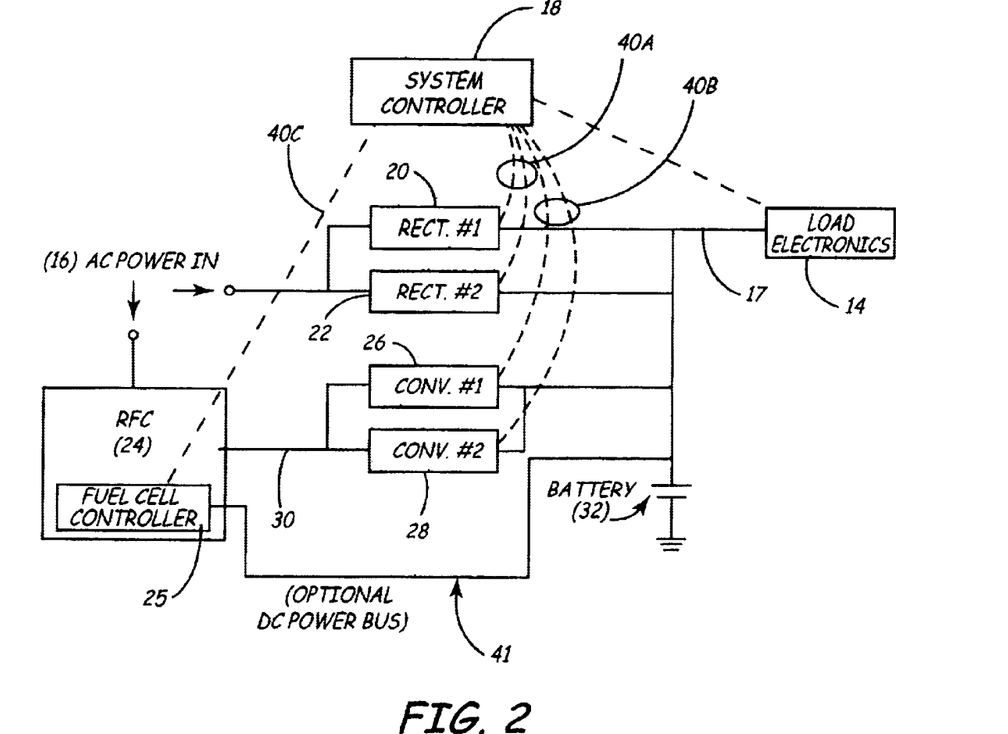
FIG. 2 is a schematic of the DC power supply illustrated in FIG. 1.

Referring now to FIGS. 1 and 2, there is illustrated a regulated DC power supply 10 having a back-up power system incorporated therein. In this example embodiment, power supply 10 is incorporated into a housing 12, and regulated DC-electrical power is supplied to load electronics 14 from primary AC input power 16. Housing 12 is configurable for outdoor and/or indoor use. In this example embodiment, the secondary power source is a regenerative fuel cell (RFC) 24. Power supply 10 includes fuel cell 24 and an optional battery arrangement 32, both of which can provide back-up power to the load. Disposed within housing 12 is also a system controller 18 that is coupled to a plurality of rack-mounted rectifiers 20, 22 and to power converters 26, 28. In this example embodiment, rectifiers and/or power converters are arrayed in parallel to provide scalability, modularity, or redundancy. In this example embodiment, two rectifiers and two converters are shown, however any number of each may be used depending on the intended application.

During normal operation, the load draws power from primary AC power 16 and it is rectified by a plurality of rectifiers 20, 22 . . . (n+1 rectifiers) and is converted into high-quality DC power and passed on to load electronics 14 via a DC bus 17. In a related embodiment, the AC power is rectified by at least one rectifier 20. Rectifiers 20, 22 are arrayed in a rack along with the optional system controller and the power converters 26, 28, which convert (or condition) the fuel cell output voltage into a voltage more acceptable to the load. Where the fuel cell is a regenerative fuel cell (RFC), the AC power can be used to regenerate the fuel and operate the fuel cell in standby or regeneration mode when the primary AC power is available. For convenience of service, the RFC may be housed in a separate compartment from the rest of the hardware.

System controller 18 communicates via signals 40A with rectifiers 20, 22 and via signals 40B with converters 26, 28 (communications is shown by dashed lines in FIG. 2 while power is shown by solid lines). In a related example embodiment, fuel cell 24 has its own fuel cell controller 25 that communicates via signals 40C with system controller 18 and/or each of the rectifiers.

When an outage occurs, i.e., the primary source of AC power is lost or interrupted for an unacceptable period of time, system controller 18 signals fuel cell controller 25 to activate fuel cell 24 (or the RFC) and fuel cell 24 continues to power the load without an unacceptable long interruption. When the primary AC source is restored, the fuel cell stops supplying power to the load through the converters. Fuel cell 24 can then be refueled manually or if it is regenerative it can begin to recharge via an electrolyzer (the part of an RFC that regenerates fuel from the reaction products of the fuel cell discharge) from the AC power source 16.

In another embodiment, a battery arrangement 32 is incorporated into power supply 10 and supports the DC load on the DC side of the rectifiers and converters. When fuel cell controller 25 activates fuel cell 24, fuel cell 24 in conjunction with the battery arrangement 32 continues to power the load without interruption.

In another embodiment, power is optionally drawn from the DC bus via auxiliary bus 41 to power the fuel cell controller. This power may also be used to power auxiliary equipment inside the fuel cell such as pumps and air blowers, which may be controlled and/or powered by the fuel cell controller.

In one example embodiment of fuel cell arrangement 24, the fuel cell is preferably a regenerative fuel cell (RFC), of the zinc-air type manufactured by Metallic Power of Carlsbad, Calif. One example of the zinc regenerative fuel cell provides approximately 1.5 kW of unregulated DC power in a voltage range of 9–17V with a runtime of about 24 hours at 1.0 kW. In another configuration, the fuel cell can run for about 72 hours at lower power levels. The fuel cell operates at temperatures ranging from 32° F. to 104° F. ambient (0° C. to 40° C.). In a related embodiment, the fuel cell includes a zinc regenerator such that when the electrical power is restored, the fuel cell automatically regenerates the zinc oxide by-product back into zinc fuel. If an outage occurs during this process, the unit will power the load using any zinc fuel stored and available in the RFC.

Figure 3:
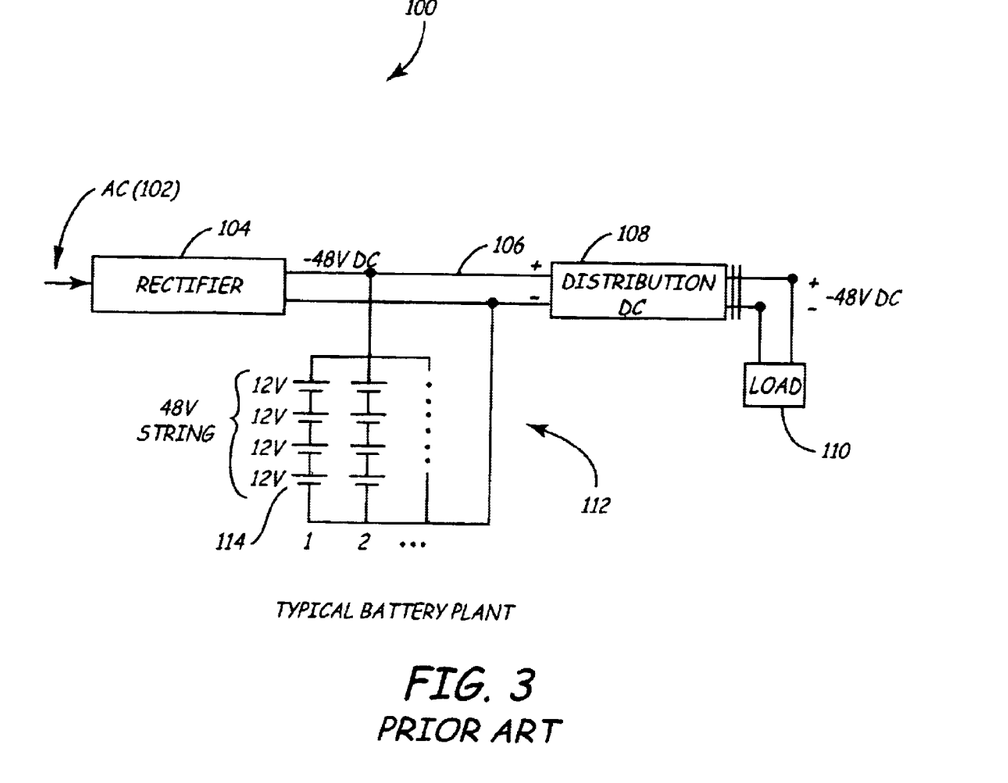
FIG. 3 is a schematic of a prior art battery back-up power system.

Referring now to FIG. 3, there is illustrated a typical power plant 100 at a telecommunications site in which a load 110 is provided with primary power from an AC source 102 such as a power grid. In this prior art example, a rectifier 104 provides −48 VDC to a DC bus 106 by using AC power. DC bus 106 is coupled to an electrical panelboard 108, for example, which is coupled to load 110. The electrical panel board 108 can include switches, fuses, circuit breakers, or other components. Connected in parallel with the rectifier is a battery arrangement 112 comprised of several strings of lead-acid type batteries (12V each) tied directly across DC bus 106. One of the main drawbacks to using this type of lead acid battery (hereinafter termed "valve regulated lead acid" or "VRLA" batteries) has been that these batteries often fail well before their design life, which is typically 10 years. Another drawback is that they are not highly reliable: depending on the make, model, operating history, and operating environment of the battery, it may provide as little as 1% of its rated backup capacity. Additionally, there is no satisfactory way to predict if and when this could happen or predict the capacity of VRLA batteries.

Upon loss of line power or rectifier fault, batteries 114 of battery arrangement 112 begin providing power to the load. Despite its current drawbacks, the VRLA battery string is the most widely used choice for delivering backup power to communications equipment for relatively short time periods (several hours or less). A typical 100 Ah (amp-hour) VRLA battery will deliver 12.5A (amps) for about 8 hours at 25° C. with a cutoff voltage of 11V per battery (44V DC for a string of four batteries). However, to use this battery design for a 24-hour backup at 12.5A it would require approximately triple the number of batteries (at triple the size and cost). There are also practical limits to the amount of amp-hours that can be designed into a single battery monobloc if one were to consider replacing the 100 Ah battery with a potential 300 Ah used in the example above. For a fuel cell, RFC, or other fueled secondary power source, extending the backup time merely requires a larger fuel tank. Therefore, such secondary power sources are much better suited than VRLA batteries to deliver energy for long periods of time.

Figure 4:
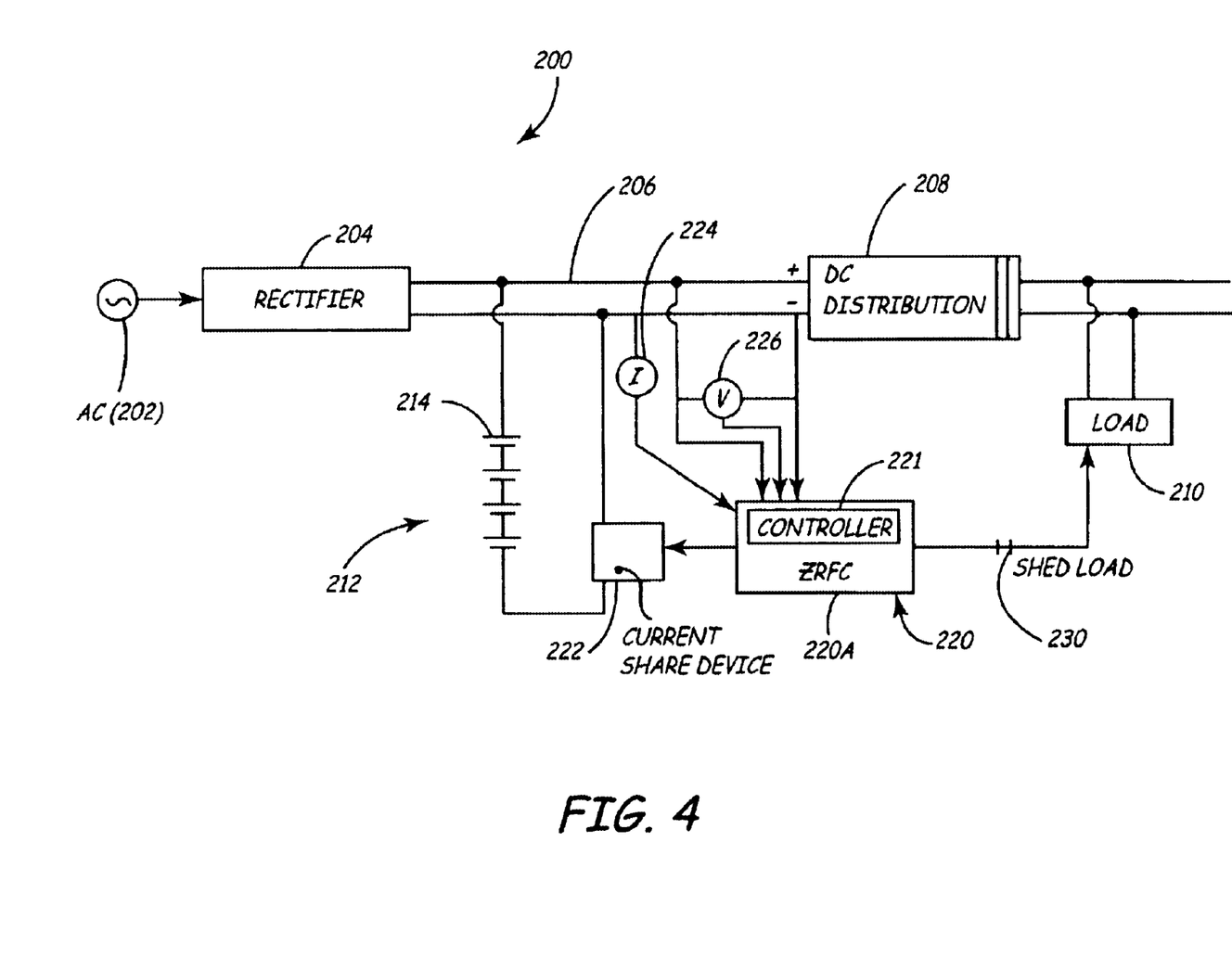
FIG. 4 is a schematic of an extended term power back-up system according to the present invention.

Referring to FIG. 4, an extended back-up power plant 200 according to the present invention is illustrated which incorporates a fuel cell system 220, comprised of a fuel cell 220A and a fuel cell controller 221, as a source of back-up power. In this example embodiment, fuel cell system 200 is utilized, either as a substitute for a VRLA battery bank 212 (comprised of individual batteries 214) or in conjunction with the battery bank, because it is more suitable for delivering energy for longer periods as compared to a VRLA battery bank. The size of the tank of the fuel cell determines the total energy stored, albeit at a lower power level in this example embodiment, as compared to battery bank 212. In this example embodiment, fuel cell system 220 is coupled to a DC bus 206 in parallel with battery bank 212 to provide long-term power backup to the load. In operation, battery bank 212 supports the whole load for a short duration, then fuel cell system 220 can pick up and support the entire load or a subset of the load for much longer periods of time (depending on the design of the fuel cell system and the load requirements).

In this example embodiment, there is illustrated a power plant 200 at a telecommunications site in which a load 210 is provided with primary power from an AC source 202 (such as a power grid). AC power is rectified by a rectifier 204 so as to provide a predefined DC voltage to DC bus 206. DC bus 206 is coupled to an electrical DC distribution panel board 208, for example, which is coupled to load 210. The DC distribution panel board can contain switches, fuses, circuit breakers and/or other components. Connected in parallel is a battery back-up arrangement 212 comprised of one or more strings of lead-acid type batteries (12V each) tied directly to DC bus 206. There are four batteries per string in this example. In series with battery bank 212 and fuel cell system 220 is a current share device 222 that controls the output current of battery bank 212 and of fuel cell system 220 upon receiving command signals from fuel cell controller 221 of fuel cell system 220. Plant 200 further includes current sensing device 224 and a voltage sensing device 226 that monitor the current and voltage on the DC bus. Fuel cell system 220 is also capable of transmitting load shedding signals 230 to load 210 to reduce the current drawn on the fuel cell, battery bank or both. In related embodiments, the load shed signals 230 can alternatively be routed via the rectifier 204 or its controller (not shown).

Upon loss of line power or rectifier fault, batteries 214 of battery bank 212 begin immediately providing power to load 210. Fuel cell controller 221 of fuel cell system 200 then senses the bus voltage and/or bus current and determines when to initiate use of fuel cell 220A to assume the duties from, or share the duties with, battery bank 212. Alternatively, fuel cell controller 221 can received a signal from rectifier 204 or its controller (not shown) signaling that line power has been lost or a rectifier fault exists or requesting activation of fuel cell system 220. Once fuel cell controller 221 senses the return of proper DC bus voltage and/or bus current and/or senses the return of line power at 202, battery bank 212 and fuel cell 220A are taken off line by controller 220A and start to draw power from 202 in order to recharge. Fuel cell system 220 can also be configured to draw power from 202 directly or via rectifier 204.

Figure 5:
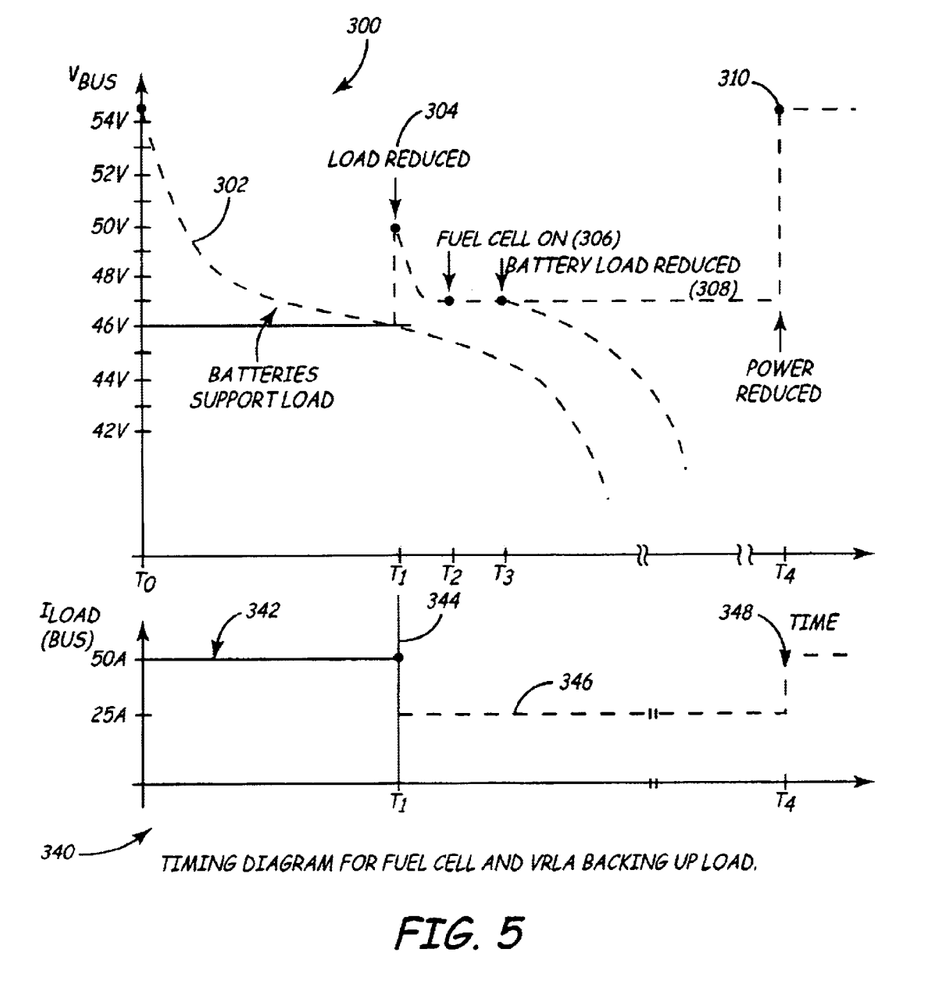
FIG. 5 is a timing diagram illustrating the initiation times for the power sharing arrangement between a secondary power source and a battery bank in a back-up power system.

Referring now to FIG. 5, a graphical timeline versus voltage usage 300 and current usage 340 by the load illustrates the steps taken by the fuel cell controller, or the system controller, to coordinate the provision of power by the fuel cell and the battery bank to the load in a load-shedding application. In particular, the fuel cell controller, or the system controller, determines the balance of power provided as a function of the load (partial or total or load-shedding opportunities), the time that primary power is interrupted or the rectifier is in a fault condition, and/or the DC bus voltage. Critical events (in terms of time) in the initiation of battery power and fuel cell power are described below.

At time T0, the initial power fails at the site and batteries begin backing up the whole load. In graph 300, line 302 indicates that the battery bank is providing support to the entire load and the fuel cell controller is sensing a drop off in voltage on the DC bus. During this time the current remains at about 50A (see line 342 of graph 340).

At time T1, the battery voltage reaches a predetermined transition voltage (above the typical cutoff voltage). At this time, the fuel cell controller, or the system controller, reduces the load (at 304) from, for example, 50 A to 25A (at 344), causing a jump in bus voltage caused by the lower current draw on the battery bank. The current then remains steady at 25A (as per line 346).

At time T2, the fuel cell begins producing power at a similar voltage (at 306) so as to stabilize the DC bus voltage.

At time T3, the fuel cell controller provides the means to share current in any desired proportion with the battery bank and starts to reduce the battery load (at 308), but maintains a steady output voltage to support the DC bus voltage.

At time T4, the line power is restored (at 310). The fuel cell controller, or the system controller, signals the fuel cell and the battery bank to stop producing power and begin recharging both. Current on the line returns to a normal level at 348 as power is restored.

In the various embodiments described, an advantage of fuel cells relative to traditional power sources such as lead acid batteries is that they can provide longer term primary and/or auxiliary/backup power more reliably and predictably. This advantage stems from the ability to continuously monitor the level of fuel stored with the fuel cell system. For long backup times, fuel cell systems can also be more cost-effective and compact than batteries. In the case of a regenerative fuel cell, for example, the duration of time over which energy can be provided is limited only by the amount of fuel and reaction medium (if used) which is initially provided in the fuel storage unit, which is fed into the system during replacement of a fuel storage unit, and/or which can be regenerated from the reaction products that are produced.

Thus, the system, comprising at least one fuel cell that comprises an optional regeneration unit and/or a replaceable fuel storage unit, can provide backup power to the one or more loads for a time in the range(s) from about 0.01 hours to about 10000 hours, or even more. In one aspect of this embodiment, the system can provide back-up power to the one or more loads for a time in the range(s) from about 0.5 hours to about 650 hours, or even more. Moreover, the system can optionally can be configured to expel substantially no reaction product(s) outside of the system (e.g., into the environment).

It should be appreciated that embodiments of metal fuel cells other than zinc fuel cells or the particular form of zinc fuel cell described above are possible for use in a system according to the invention. For example, aluminum fuel cells, lithium fuel cells, magnesium fuel cells, iron fuel cells, sodium fuel cells, and the like are possible. It should also be appreciated that various embodiments using hydrogen fuel cells as the RFC are possible for use in a back-up power system according to the invention. For example, regenerative hydrogen fuel cells using stored compressed hydrogen gas fuel, liquid hydrogen fuel, or hydrogen stored in metal hydrides, carbon nanotubes, or other hydrogen storage media are possible. Non-regenerative hydrogen fuel cells with or without reformers and using natural gas, diesel fuel, methanol, or hydrogen fuel can also be used. Other secondary power sources besides fuel cells such as diesel generators, propane generators, or gas turbines can also be substantiated for use in a system according to the invention.

Regenerative fuel cells are attractive energy storage systems for backup power applications of the present invention because they can have lower lifecycle costs than batteries, and they can be environmentally safe and more dependable. Fuel cells offer advantages over internal combustion engines for backup power, such as noise reduction, zero emissions and potentially lower maintenance costs.

An additional type of energy storage device useful for backup power systems is the "flow battery," which is similar to a metal/air fuel cell except that solid metal fuel is not pumped into the electrochemical cells. For example, in the zinc/bromine flow battery, the zinc fuel is stored in fixed form as a fail or a screen with bromine flowing to the counter electrode. In other respects, the zinc/bromine flow battery is similar to a zinc/air fuel cell and therefore can be considered to be in the category of a form of are generative fuel cells. In the zinc/bromine fuel cell, for example, bromine is the oxidizer rather than oxygen from the air as in a zinc/air fuel cell.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

We claim:

1. A regulated DC power supply comprising:
   a rectifier coupled between a primary AC power source and a DC bus, the rectifier adapted to convert AC power from the AC power source to DC power for a load;
   a fuel cell arrangement electrically coupled to a power converter that is coupled to the DC bus, the converter adapted to condition an unconditioned DC power output of the fuel cell to the load; and
   a fuel cell controller communicatively coupled with the fuel cell arrangement and adapted to initiate DC power output from the fuel cell arrangement upon detecting an AC power outage; and disengage the fuel cell upon detecting AC power resumption.

2. The DC power supply of claim 1, further comprising a system controller communicatively coupled to the rectifier and to the fuel cell controller, wherein the system controller is adapted to engage the fuel cell arrangement via the fuel cell controller upon detecting an AC power outage and disengage the fuel cell arrangement upon detecting AC power resumption.

3. The DC power supply of claim 1, further comprising a plurality of rectifiers coupled between the AC power source and the DC bus.

4. The DC power supply of claim 3, further comprising a plurality of power converters coupled between the fuel arrangement and the DC bus.

5. The DC supply of claim 3, further comprising a chassis adapted to support the rectifiers in an N+1 redundancy arrangement.

6. The DC supply of claim 5, wherein the chassis is adapted to support a backplane having an AC bus, a conditioned DC bus and the unconditioned DC bus mounted thereon.

7. The DC power supply of claim 1, further comprising a plurality of power converters coupled between the fuel arrangement and the DC bus.

8. The DC power supply of claim 1, further comprising a battery arrangement electrically coupled to the DC bus and adapted to provide uninterrupted DC power to the load when the power level drops below a predetermined level.

9. The DC power supply of claim 8, further comprising a current share device coupled to the DC and adapted to control the output current of the battery and the fuel cell.

10. In DC power supply of claim 1, further comprising an auxiliary DC power has adapted to provide power to the fuel cell controller and the fuel cell components.

11. The DC power supply of claim 1, wherein the fuel cell controller is adapted to control the load so as to conduct load-shedding to reduce the current driven on the fuel cell.

12. A regulated DC power supply comprising:
    a plurality of rectifiers coupled between a primary AC power source and a DC bus, the rectifiers adapted to convert AC power from the AC power source to DC power for a load;
    a regenerative fuel cell (RFC) arrangement electrically coupled to a plurality of power converters that are coupled in parallel with the DC bus, the converters adapted to condition a DC power output of the RFC arrangement to the load; and
    a fuel cell controller communicatively coupled with the fuel cell arrangement and adapted to initiate DC power output from the fuel cell arrangement upon detecting an AC power outage.

13. The DC power supply of claim 12, further comprising a system controller communicatively coupled to the rectifiers.

14. The DC power supply of claim 13, wherein the system controller is coupled to the RFC controller and adapted to request power from the RFC via the fuel cell controller upon detecting an AC power outage.

15. The DC supply of claim 12, wherein the RFC is recharged by drawing power from the DC bus supplied by the rectifiers from the AC source.

16. The DC supply of claim 12, wherein the RFC is recharged without drawing power from the DC bus.

17. The DC supply of claim 12, further comprising a chassis adapted to support the rectifiers in an N+1 redundancy arrangement.

18. The DC supply of claim 17, wherein the chassis is adapted to support a backplane that includes an AC bus and the DC bus mounted thereon.

19. The DC supply of claim 17, further comprising a battery arrangement electrically coupled to the DC bus and adapted to provide uninterrupted DC power to the load when the power level drops below a predetermined level.

20. The DC supply of claim 12, wherein the battery arrangement is recharged by drawing power from the DC bus supplied by the rectifiers from the AC source.

21. A method of providing extended backup power to a load via a power plant having a battery arrangement, the method comprising:
    providing DC power to the load from the battery arrangement via a DC bus upon interruption of a primary power source;
    shedding a portion of the load when the DC bus voltage reaches a predetermined transition voltage;
    providing power to the DC bus at or below a predetermined DC bus voltage from a secondary power source;
    using a secondary power source controller to share current between the battery arrangement and the secondary power source; and
    upon detecting primary power source resumption, switching the load from the secondary power source and battery arrangement to the primary power source via the secondary power source controller.

22. The method of claim 21, further comprising the step of recharging the fuel cell arrangement and the battery arrangement after the fuel cell controller has switched the load to the primary power source.

23. A DC power plant configured to provide extended backup power to a load, the power plant including a battery arrangement adapted to temporarily provide power to the load upon interruption of a primary power source, the power plant comprising:
    a secondary power source adapted to provide extended backup power to the load via a DC bus; and
    a secondary power source controller adapted to shed a portion of the load when the battery voltage reaches a predetermined transition voltage and to thereafter initiate power production from the secondary power source, wherein the controller is also adapted to share current between the battery arrangement and the secondary power source.

24. The DC power plant of claim 23, wherein the secondary power source controller is also adapted to switch the load from the secondary power source and battery arrangement to the primary power source after primary power source resumption.

25. The DC power plant of claim 23, wherein the secondary power source is a fuel cell.

26. The DC power plant of claim 25, wherein the fuel cell is a regenerative fuel cell.

* * * * *